UNITED STATES PATENT OFFICE.

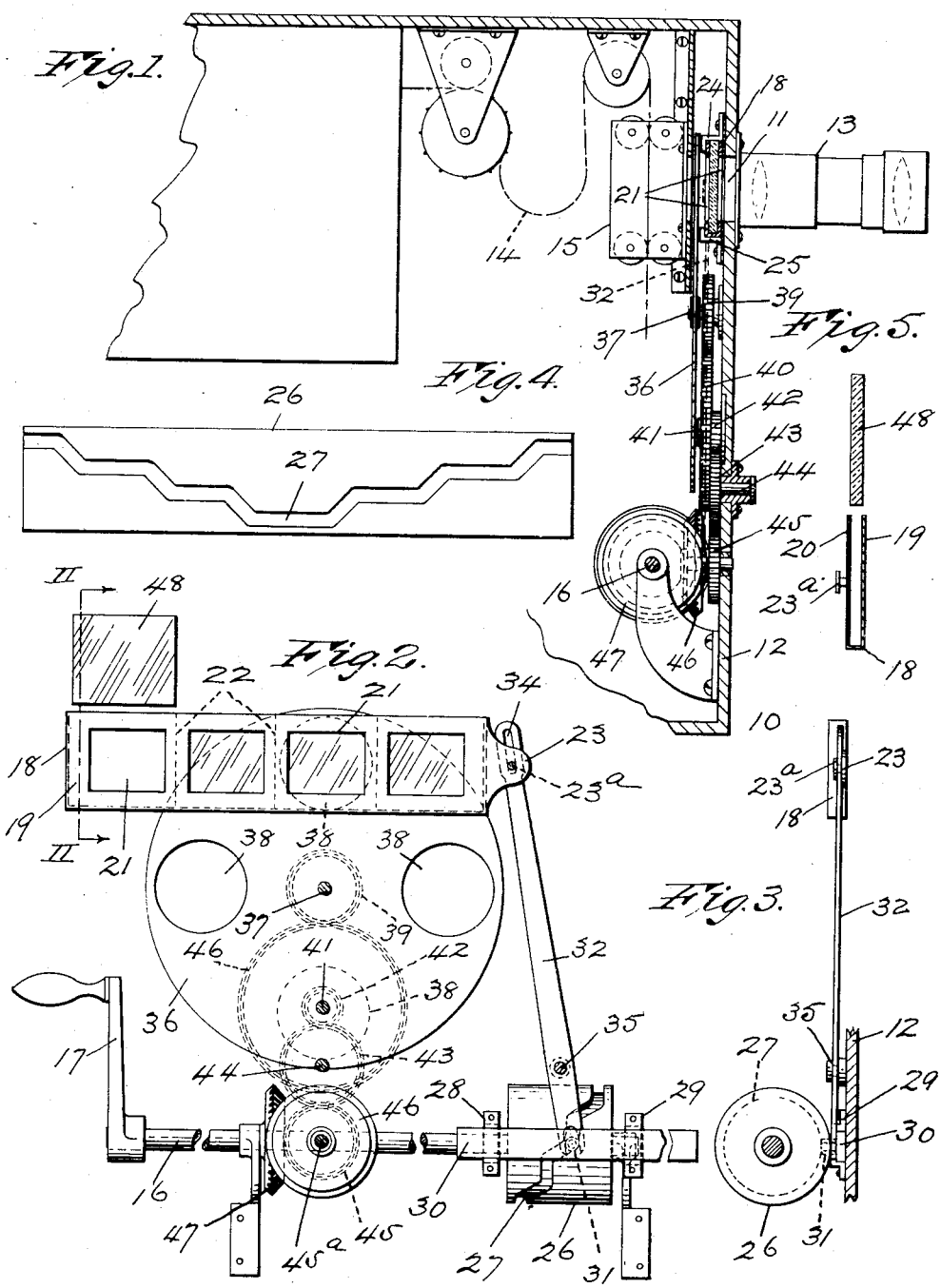

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER FOR MOVING-PICTURE MACHINES.

1,094,147.   Specification of Letters Patent.   Patented Apr. 21, 1914.

Application filed November 8, 1913. Serial No. 799,916.

*To all whom it may concern:*

Be it known that I, FREDERICK W. HOCHSTETTER, a subject of the Emperor of Germany, and a resident of New York, county and State of New York, have invented a certain new and useful Improvement in Shutters for Moving-Picture Machines, of which the following is a full, clear, and exact specification.

This invention relates to a class of devices adapted to be used in conjunction with machines for photographing and exhibiting moving pictures.

My invention has for its object primarily to provide a shutter designed to be applied to a camera for use in photographing living objects, or scenery either in black and white effects, or in natural colors upon preferably a transparent film as well as being adapted to be utilized in conjunction with a projecting apparatus for displaying the pictures upon a screen, and wherein is employed a holder having a plurality of openings, the holder being adapted to be reciprocably transmitted transversely so that the openings thereof will consecutively register with the exposure window of the machine.

Other objects of the invention are to provide a form of frame or holder, whereby one or more transparent plates of the primary colors may be carried therein; to provide a revolving apertured disk which serves to alternately cut-off and permit the passage of light through the openings of the holder; to provide a cam for intermittently checking the movement of the holder as well as imparting reciprocation thereto when the drive shaft is driven; and to provide means which serves to impart rotation from the drive shaft to the apertured disk simultaneously with the operation of the reciprocable holder.

A practical embodiment of the invention is represented in the accompanying drawing forming a part of this specification in which similar characters of reference indicate corresponding parts in all the views, the said invention being more fully described hereinafter and then pointed out in the claims at the end of the description.

In the drawing, Figure 1 is a fragmentary section, partly in detail, taken through a moving picture machine, with one form of shutter embodying my invention applied thereto. Fig. 2 is an enlarged front view of the shutter, and the mechanism for operating the same from a common drive shaft. Fig. 3 is a view, partly in section, of one end of the shutter, Fig. 4 is an enlarged view of the development of the cam for operating the holder of the shutter, and Fig. 5 is a section taken on the line II—II of Fig. 2. The shutter is adapted to be employed in conjunction with a machine for projecting moving pictures, or may be used upon a camera for photographing living objects, or scenery in black and white effects, or in natural colors, and which has a casing 10 provided with an exposure window 11 in its front wall 12 upon which is mounted the usual telescopic lens barrel, as 13, the machine being provided with the customary mechanism for intermittently transmitting a film, as 14, through a framing device 15 which is arranged in the machine at the exposure window 11, and which is provided with the usual windows, all of which may be of the usual, or any preferred types. The shutter is operated in unison with the operation of the mechanism of the machine through the medium of a common drive shaft 16 which is preferably manually operable by a crank handle 17.

The shutter has a substantially rectangular frame, or holder 18 composed of a front wall 19 and a rear wall 20 which is spaced from the front wall. The lower longitudinal edges of the walls 19 and 20 are connected together, while the upper longitudinal edges of said walls are disconnected to provide an opening into the holder. Through corresponding parts of the walls 19 and 20 are a plurality of spaced registered openings 21 each of which is approximately the same dimension as the exposure window 11 of the machine. Within the holder, and between each pair of the registered openings 21, is a partition 22 whereby a number of chambers is provided in the holder, and extending from one end of the holder is a lug 23 having a pin 23ª extending therefrom. The holder 18 is supported between two brackets, as 24 and 25, which are secured upon the inner surface of the front wall of the casing of the machine to permit the holder to be reciprocated transversely so that each pair of the openings 21 thereof will be intermittently registered with the exposure window 11.

Serving as means to reciprocate the holder 18 as well as intermittently checking its reciprocatory movement when the machine is operated by the rotation of the drive shaft 16, upon the drive shaft is held a cam 26. The cam 26 is in the form of a drum in the peripheral surface of which is a continuous irregular groove 27 which, as shown, is formed somewhat in the fashion of steps disposed diagonally from one end to the other end thereof in one-half of its periphery, and the groove is similarly disposed in a reverse direction in the second half of the periphery of the drum. To one of the walls of the casing of the machine is fastened two substantially U-shaped spaced straps 28 and 29 supporting a bar 30 which is slidably movable in the straps in a longitudinal direction with relation to the cam-drum. Extending from one surface of the slidable bar 30 is a pin upon which is a freely rotatable roller 31 movably disposed in the irregular groove 27 of the cam-drum 26. Disposed in straddle arrangement upon the roller 31, and between the cam-drum 26 and the slidable bar 30, is the bifurcated lower end of a lever 32, the upper end of which is slotted, at 34, and through said slot is passed the pin 23ª of the lug 23 of the holder 18. The lower portion of the lever 32 is fulcrumed, at 35, to the front wall of the casing of the machine so that when the drum 26 is revolved by the rotation of the drive shaft 16 the roller 31 will be guided in the groove 27 of the cam-drum for intermittently sliding the bar 30 back and forth in the straps 28 and 29, and the upper part of the lever will thereby be swung upon its fulcrum to reciprocate the holder 18 in a transverse direction as well as intermittently checking the holder for registering the openings 21 thereof with the exposure window 11 of the machine. The film will in turn be subjected to intermittent exposures of light when focused through the lens-barrel of the machine.

In order to intermittently cut-off the light when directed from the interior of the machine through the framing device 15 upon the film, especially when the shutter is used in conjunction with a projecting apparatus, I may employ a disk, as 36, held upon a stud 37 which is journaled in the front wall of the casing of the machine. Through the disk 36 are a number of openings 38 which are spaced apart a sufficient distance whereby each opening will register with one of the openings 21 of the holder 18 when the shutter is operated. The blank parts of the disk 36 thereby serve to intermittently cut-off the light when directed from the interior of the machine through the framing device 15.

Serving as means to revolve the disk 36 in unison with the reciprocation of the holder 18 when the drive shaft is driven, on the stud 37 is held a small gear 39 meshing with a large gear 40 held upon a stud 41 journaled in the front wall of the casing of the machine. Also held upon the stud 41 is a pinion 42 which is in mesh with an idler 43 held upon a stud 44 journaled in the front wall of the casing, and this idler is in mesh with a gear 45 held upon a stud 45ª which is also journaled in the casing of the machine. On the stud 45ª is held a bevel gear 46 which is in mesh with a bevel gear 47 held upon the drive shaft 16, and by properly gearing the disk 36 in this manner it will be revolved by the rotation of the drive shaft simultaneously with the reciprocation of the holders 18 for accurately registering the openings of the disk and the openings of the holder so as to control the intermittent passages of light whether directed through the lens barrel into the machine, or directed from the interior of the machine through the framing device 15.

When the shutter is employed in conjunction with a machine for producing and exhibiting moving pictures in black and white effects it is used, as above described, without any colored plates, but when utilized for producing and exhibiting the pictures in colors, through the top opening of the holder 18 is inserted one, or a number of colored, plates of glass, or other transparent material, as 48. As is usual in the art of producing and displaying this class of moving pictures, each of the transparent plates is preferably of one of the primary colors, and as the holder 18 may be provided with a desired number of the openings 21 any suitable number of the plates may be used with the shutter.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope of the appended claims.

Having thus described my invention, I claim as new and desire to secure by Letters Patent:—

1. In a shutter of the character described, the combination with a casing having an exposure window through which light is focused, of a substantially rectangular holder having a number of spaced openings therethrough, said holder being supported in the casing so as to be reciprocated and intermittently checked during its reciprocation, whereby each opening will consecutively register with the exposure window for passage of light therethrough, and said holder being adapted to carry a number of transparent plates, a drive shaft, and means connected to the drive shaft and to the holder for imparting a reciprocatory movement to the holder and also for intermittently checking the movement of the holder when the drive shaft is rotated.

2. In a shutter of the character described, the combination with a casing having an exposure window through which light is focused, of a substantially rectangular chambered holder having an open top, and having a number of spaced registered openings therethrough, said holder being supported in the casing so as to be reciprocated and intermittently checked during its reciprocation, whereby each pair of the registered openings will consecutively register with the exposure window for passage of light therethrough, and said holder being adapted to carry a number of transparent plates, a drive shaft, a cam held upon the drive shaft, and means connected to the holder and operated by the cam for imparting a reciprocatory movement to the holder and also for intermittently checking the movement of the holder when the drive shaft is rotated.

3. In a shutter of the character described, the combination with a casing having an exposure window through which light is focused, of a substantially rectangular holder having a number of spaced openings therethrough, said holder being supported in the casing so as to be reciprocated and intermittently checked during its reciprocation, whereby each opening will consecutively register with the exposure window for passage of light therethrough, and said holder being adapted to carry a number of transparent plates, a drive shaft, a cam held upon the drive shaft, and a lever pivoted to the holder and movably connected to the cam for imparting a reciprocatory movement to the holder and also for intermittently checking the movement of the holder when the drive shaft is rotated.

4. In a shutter of the character described, the combination with a casing having an exposure window through which light is focused, of a substantially rectangular holder having a number of spaced openings therethrough, said holder being supported in the casing so as to be reciprocated and intermittently checked during its reciprocation, whereby each opening will consecutively register with the exposure window for passage of light therethrough, and said holder being adapted to carry a number of transparent plates, a drive shaft, means connected to the drive shaft and to the holder for imparting a reciprocatory movement to the holder and also for intermittently checking the movement of the holder when the drive shaft is rotated, a disk having a number of spaced apertures therethrough, said disk being revolubly held in the casing so that each of its openings will register consecutively with one of the openings of the holder, and means operated when the drive shaft is driven for revolving the disk in unison with the reciprocation of the holder.

5. In a shutter of the character described, the combination with a casing having an exposure window through which light is focused, of a substantially rectangular chambered holder having an open top, and having a number of spaced registered openings therethrough, said holder being supported to the casing so as to be reciprocated and intermittently checked during its reciprocation, whereby each pair of the registered openings will consecutively register with the exposure window for passage of light therethrough, and said holder being adapted to carry a number of transparent plates, a drive shaft, a cam held upon the drive shaft, means connected to the holder and operated by the cam for imparting a reciprocatory movement to the holder and also for intermittently checking the movement of the holder when the drive shaft is rotated, a disk having a number of spaced apertures therethrough, said disk being revolubly held in the casing so that each of its openings will register consecutively with one of the openings of the holder, and means operated when the drive shaft is driven for revolving the disk in unison with the reciprocation of the holder.

6. In a shutter of the character described, the combination with a casing having an exposure window through which light is focused, of a substantially rectangular holder having a number of spaced openings therethrough, said holder being supported in the casing so as to be reciprocated and intermittently checked during its reciprocation, whereby each opening will consecutively register with the exposure window for passage of light therethrough, and said holder being adapted to carry a number of transparent plates, a drive shaft, a cam held upon the drive shaft, a lever pivoted to the holder and movably connected to the cam for imparting a reciprocatory movement to the holder and also for intermittently checking the movement of the holder when the drive shaft is rotated, a disk having a number of spaced apertures therethrough, said disk being revolubly held in the casing so that each of its openings will register consecutively with one of the openings of the holder, and gearing operated when the drive shaft is driven for revolving the disk in unison with the reciprocation of the holder.

7. In a shutter of the character described, the combination with a casing having an exposure window through which light is focused, of a substantially rectangular chambered holder having an open top, and having a number of spaced registered openings therethrough, said holder being supported in the casing so as to be reciprocated and intermittently checked during its reciprocation, whereby each pair of the registered openings will consecutively register with the exposure window for passage of light therethrough, and said holder being adapted to carry a number of transparent plates, a drive shaft, a cam held upon the drive shaft, means connected to the holder and operated by the cam for imparting a reciprocatory movement to the holder and also for intermittently checking the movement of the holder when the drive shaft is rotated, a disk having a number of spaced apertures therethrough, said disk being revolubly held in the casing so that each of its openings will register consecutively with one of the openings of the holder, and gearing operated when the drive shaft is driven for revolving the disk in unison with the reciprocation of the holder.

This specification signed and witnessed this seventh day of November A. D. 1913.

FREDERICK W. HOCHSTETTER.

Witnesses:
   ROBT. B. ABBOTT,
   M. DERMODY.